No. 802,700. PATENTED OCT. 24, 1905.
T. LEBEAU.
MACHINE FOR MOLDING BUTTER.
APPLICATION FILED MAR. 15, 1905.

2 SHEETS—SHEET 1.

WITNESSES
Farnum F. Dorsey
Alfred H. Aldrich

INVENTOR
Theophile Lebeau
by his Attorneys
Philipp Van Eurent Fish

No. 802,700. PATENTED OCT. 24, 1905.
T. LEBEAU.
MACHINE FOR MOLDING BUTTER.
APPLICATION FILED MAR. 15, 1905.

2 SHEETS—SHEET 2.

WITNESSES
Farnum F. Dorsey
Alfred N. Hildreth

INVENTOR
Theophile Lebeau
by his Attorneys
Phillips Van Leuven
& Fish

UNITED STATES PATENT OFFICE.

THEOPHILE LEBEAU, OF LYNN, MASSACHUSETTS.

MACHINE FOR MOLDING BUTTER.

No. 802,700. Specification of Letters Patent. Patented Oct. 24, 1905.

Application filed March 15, 1905. Serial No. 250,224.

*To all whom it may concern:*

Be it known that I, THEOPHILE LEBEAU, a citizen of the United States, residing at Lynn, in the county of Essex and State of Massachusetts, have invented certain new and useful Improvements in Machines for Molding Butter; and I do hereby declare the following to be a full, clear, and exact description of the invention, such as will enable others skilled in the art to which it appertains to make and use the same.

The present invention relates to improvements in machines for molding butter.

The object of the invention is to produce a machine for use in restaurants, hotels, and other places where butter is served which will form the butter into small molds or portions and insert the molds in suitable receptacles or dishes ready to serve, so that no handling of the molds of butter is necessary.

Other objects of the invention will be apparent from the following description of the preferred embodiment thereof.

Figure 1:
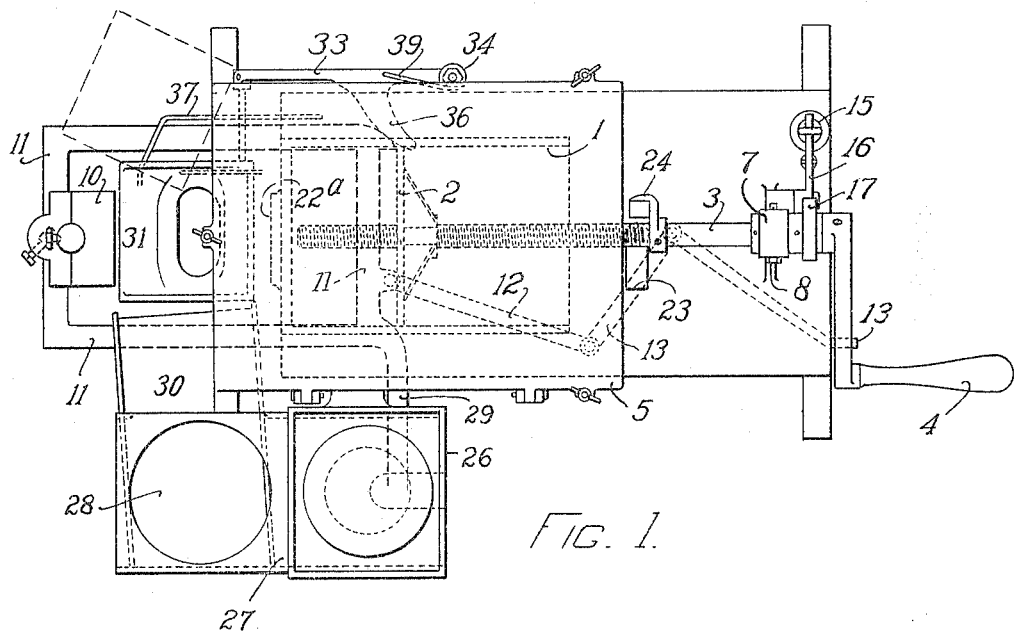
Figure 2:
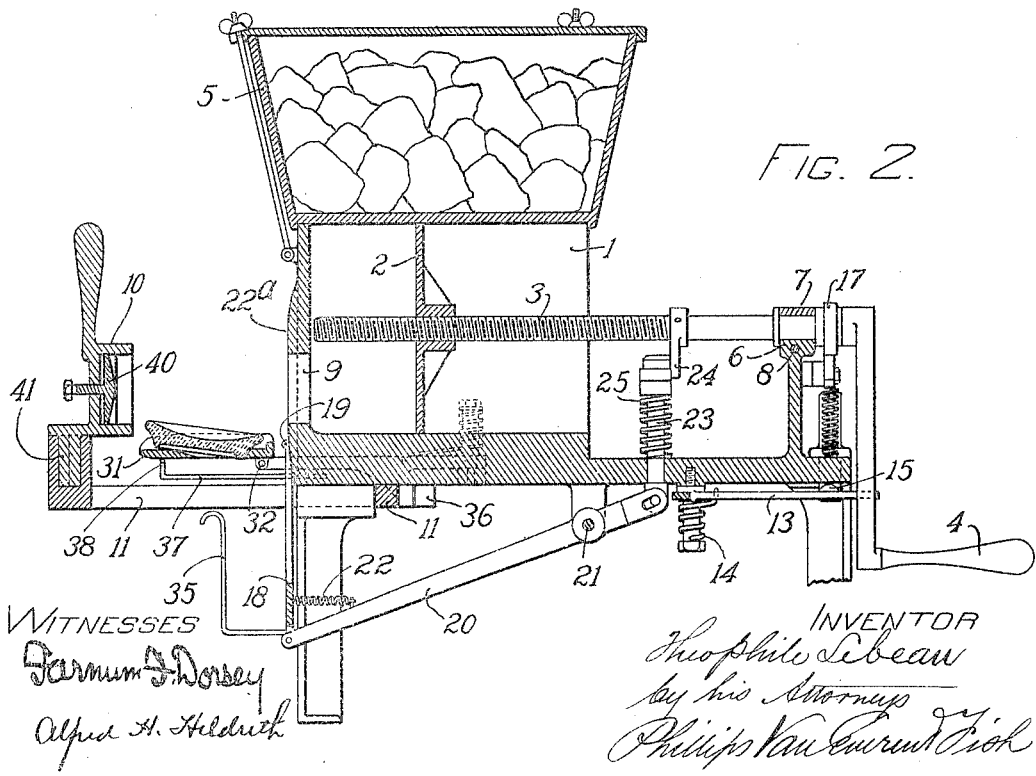
Figure 3:
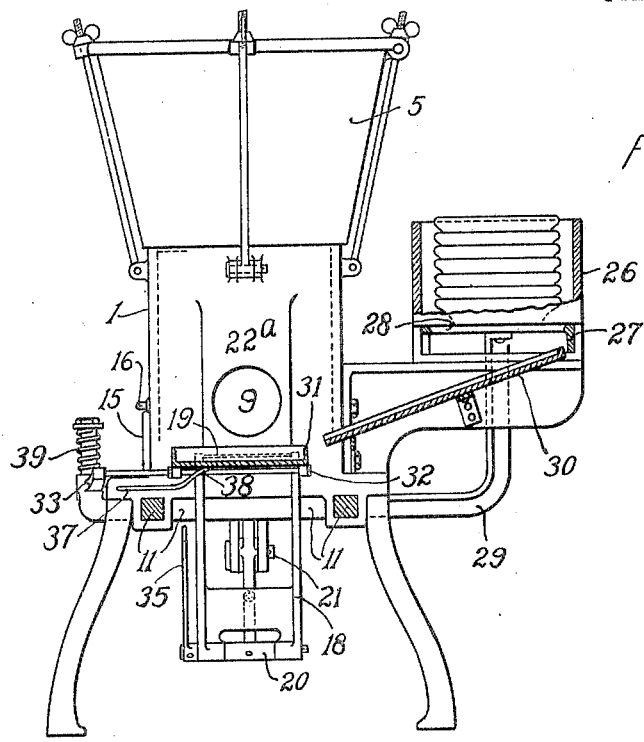
Figure 4:
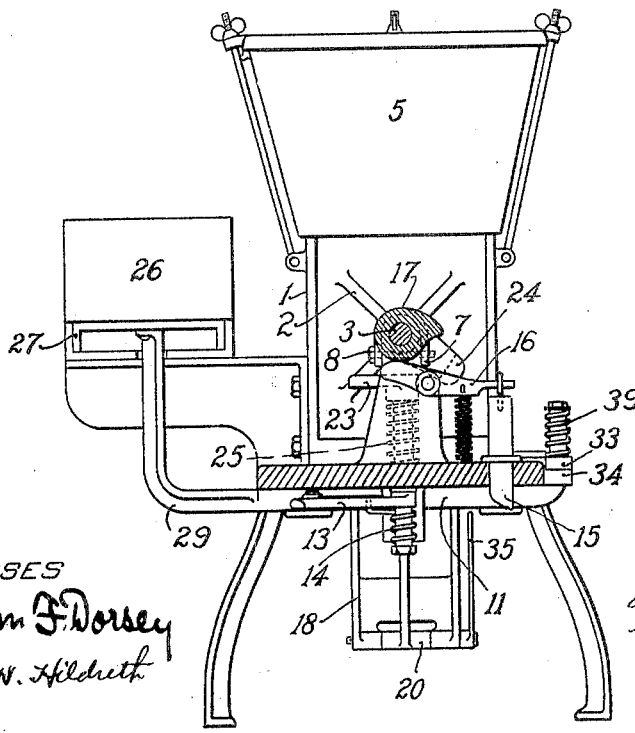

In the drawings, Figure 1 is a plan view of the preferred embodiment of the invention. Fig. 2 is a longitudinal vertical section. Fig. 3 is a front view, partly in section; and Fig. 4 is a rear view, partly in section.

The illustrated embodiment of the invention comprises a press in which the butter is placed in bulk, provided with means for expressing the butter through a suitably-formed orifice in a continuous stream, a reciprocating mold for impressing a suitable form upon the butter as it issues from the press, means for cutting off the molded portion of butter, and automatic means for feeding dishes, inserting the molds of butter therein, and discharging the dishes.

The press 1 is provided with a sliding follower 2, which is actuated by a screw-threaded shaft 3, turned by a crank 4. The mold has a removable cover 5, which is made hollow in order to contain ice to keep the butter cool. The screw-threaded shaft 3 is supported in a journal 6 on the frame of the machine, and in order to facilitate filling the press the journal is provided with a removable cap 7, secured by a pin 8, so that the shaft 3 and follower 2 may be conveniently removed from the press. The butter issues from the press through an orifice 9, which may be of any shape which it is desired to impart to the issuing stream of butter.

The mold 10 is carried by a horizontal slide 11, having bearings on the frame of the machine, and at suitable times in the operation of the machine the mold-slide 11 and the mold are drawn to the right so as to move the mold to the orifice and cause it to operate upon the butter issuing therefrom. The slide 11 is connected by a link 12 with a bell-crank lever 13, pivoted to the frame of the machine. One arm of the bell-crank lever 13 is engaged by the crank 4 during a part of its rotation, and the lever is thereby swung about its pivot and acts to move the slide 11 and the mold. A spring 14, connected with the lever 13, tends to return it to the position of Fig. 1 and to withdraw the mold from the butter; but in order that the mold may remain in operative position while a sufficient amount of butter is expressed from the press to fill the mold a latch 15, sliding vertically in the frame of the machine, is arranged to engage and hold the lever 13 when swung back as above described. The latch is connected with a pivoted lever 16, bearing against a cam 17, fixed to the shaft 3, and after the shaft has turned sufficiently to fill the mold with butter a projection on the cam 17 rocks the lever 16 and raises the latch, thereby releasing the lever 13 and permitting the parts to return to the position of the drawings.

The means for cutting off the molded portion of butter comprise a frame 18, having two arms, between which a wire 19 is stretched. The frame 18 is pivoted to a lever 20, pivotally connected at 21 to the frame of the machine. A spring 22, connecting the frame 18 and the lever 20, draws the wire 19 closely against a projecting surface 22$^a$ on the front end of the press. The rear end of the lever 20 is connected with a plunger 23, arranged to slide vertically in the frame of the machine and periodically engaged by a cam-arm 24, fixed to the shaft 3. When the cam-arm engages and depresses the plunger 23, the wire 19 moves upward across the aperture 9 and cuts off the butter close thereto. A spring 25, surrounding the plunger 23, insures the return of the parts to the position of the drawings when the plunger is disengaged by the cam-arm.

The means for feeding the dishes or other receptacles for the butter comprise a box 26 in which a pile of dishes is placed and a feed-slide 27, arranged to slide horizontally across the bottom of the box 26. The feed-slide has a flat portion, upon which the dishes are normally supported, and an opening 28, large enough to receive one dish. The feed-slide is connected by an arm 29 with the mold-slide 11, so that when the latter moves to the right the feed-slide moves simultaneously, so that the opening 28 is brought under the pile of dishes and the lowermost dish falls into the opening. Upon the subsequent return movement of the mold-slide and the feed-slide the dish in the opening 28 is transferred to a chute 30, down which it slides. From the chute the dish is discharged to a dish-holder 31, which is pivoted at 32 to a supporting-arm 33, pivoted at 34 to the frame of the machine. The lever 20 is provided with an extension 35, which engages the dish-holder 31 as the lever 20 rises during the cutting operation and tilts the dish-holder and the dish to a vertical position, thereby bringing the dish into contact with the portion of butter which is being separated by the wire 19. When the lever 20 descends, the dish-holder and dish resume their horizontal position and the butter adheres to the dish and remains therein. In order to discharge the dish which has been filled with butter, the arm 33 is provided with a cam-surface 36, engaged by a corresponding surface on the mold-slide 11, and during the right-hand movement of the mold-slide the arm 33 is by these means swung outward, carrying the dish-holder 31 to the position shown in dotted lines in Fig. 1. The dish-holder when in its horizontal position is supported by an arm 37, projecting from the frame of the machine, and the extremity of this arm is provided with an upturned portion 38, which engages the dish-holder when in the position shown in full lines, Fig. 1; but when the dish-holder is swung into the position shown in dotted lines it disengages the portion 38 of the arm 37 and is allowed to tilt downward to a sufficient extent to permit the dish to slide off onto a suitable chute or other receptacle. When the mold-slide returns to the position of the drawings, the arm 33 is swung inward by a spring 39 secured thereto.

The mold 10 is provided with a movable bottom 40 to facilitate cleaning the mold or removing any butter adhering thereto, and the mold is removably secured in the slide 11 by means of a shank 41, engaging a socket on the slide, so that molds of various patterns may be used.

The operation of the machine in general is as follows: Starting with the press in the position shown in the drawings, the crank is turned continuously to the left and the follower 2 continuously expresses the butter from the orifice 9. During the first part of the rotation of the crank the mold is drawn against the butter and is held there until enough butter has emerged to fill it. Simultaneously with this movement of the mold the feed-slide 27 moves to the right and receives a dish. Upon the continued rotation of the crank the cam 17 and the parts connected therewith act to release the mold-slide and the mold moves back again to the position of the drawings. Simultaneously the feed-slide transfers the dish to the chute 30, and the dish thereupon is discharged into the dish-holder 31, as shown in dotted lines, Fig. 2. Thereafter the cam-arm 24, through the intermediate mechanism above described, actuates the cutting-wire and the dish-holder to sever the butter and apply it to the dish, and during the succeeding right-hand movement of the mold-slide the dish-holder swings out and discharges the dish.

The invention having been thus described, what is claimed is—

1. A butter-molding machine, having, in combination, a press for expressing the butter in a stream, a reciprocating mold intermittently engaging and molding the end of the stream of butter, means for applying a dish to the butter, and means for cutting off the portion of butter in contact with the dish, substantially as described.

2. A butter-molding machine, having, in combination, a press for expressing the butter in a stream, means for carrying a dish to a position adjacent to the stream of butter and then raising the dish and pressing it against the butter so that the butter will adhere to the dish, and means for cutting off the portion of butter in contact with the dish, substantially as described.

3. A butter-molding machine, having, in combination, a press for expressing the butter in a stream, a reciprocating mold engaging and molding the end of the stream of butter, means for holding a supply of dishes, a feed-slide for feeding the dishes one by one, an inclined chute down which the dishes slide when fed, a dish-holder into which the dishes are discharged from the chute, means for actuating the dish-holder to apply the dishes to the end of the stream of butter, and means for cutting off the portion of butter in contact with a dish, substantially as described.

4. A butter-molding machine, having, in combination, a press provided with an orifice through which the butter is forced in a stream, means for holding a dish and applying it to the end of the issuing stream of butter, and means for cutting off the portion of the butter in contact with the dish, substantially as described.

5. A butter-molding machine, having, in combination, a press provided with an orifice through which the butter is forced in a stream, means for holding a dish in contact with the stream of butter, and means for cutting off the portion of butter in contact with the dish, the dish-holding means operating automatically to remove the dish after the butter is cut off, substantially as described.

6. A butter-molding machine, having, in combination, a press, a follower, a screw-threaded shaft engaging the follower and supported in a journal, and removable means for securing the shaft in the journal arranged to permit its removement laterally therefrom, substantially as described.

In testimony whereof I affix my signature in presence of two witnesses.

THEOPHILE LEBEAU.

Witnesses:
   HORACE VAN EVEREN,
   FARNUM F. DORSEY.